3,089,819
METHOD FOR THE TREATMENT OF HYPERTENSION

James Harold Short, Lake Forest, Ill., assignor to Abbott Laboratories, North Chicago, Ill., a corporation of Illinois
No Drawing. Filed Sept. 5, 1961, Ser. No. 135,764
7 Claims. (Cl. 167—65)

This invention is concerned with a method for the treatment of hypertension involving compositions containing 1-(orthomethoxyphenyl)-4-(3-methylthiopropyl)-piperazine having the formula

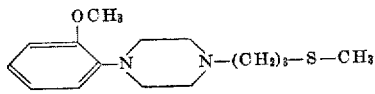

and its non-toxic, acid-addition salts such as the hydrochloride, hydrobromide, hydroiodide, phosphate, sulfate, acetate, citrate, tartrate, benzoate, salicylate, glycolate, succinate, nicotinate, ascorbate, maleate, malate, lactate and the like. The base as well as its acid-addition salts are useful in lowering blood pressure in humans and animals alike. The base and its salts also produce a tranquilizing action. When a 10 mg. dose of the base or one of its salts is administered intravenously to cats, there is an immediate marked drop in blood pressure.

The compound of the present invention and its salts can be readily prepared as shown in the following example.

EXAMPLE 1

A solution of 12.5 grams (0.12 mole) of 3-methylthiopropylamine, 29.5 grams (0.12 mole) of N,N-bis(beta-chloroethyl)-orthomethoxyaniline, 30 grams (0.3 mole) of triethylamine and 100 ml. of butanol was heated with constant stirring at the boiling temperature and under reflux for 15 hours. The solvent was then removed from the reaction mixture and 200 ml. of water was added to the residue. The aqueous solution was extracted with three 100 ml. portions of benzene and the benzene thereafter removed. The resulting residue was fractionally distilled under reduced pressure to obtain the desired 1 - (orthomethoxyphenyl) - 4 - (3 - methylthiopropyl)-piperazine as a viscous liquid boiling at 168–170° C. at 0.7 mm. pressure and having a refractive index $n_D$ of 1.5628 at 26° C. Upon analysis the product was found to contain 64.21% carbon and 8.49% hydrogen compared to the calculated values of 64.25% and 8.63%, respectively.

The dihydrochloride salt of the above base was prepared by the reaction of one molecular proportion of said base with two molecular proportions of hydrochloric acid in an isopropyl alcohol medium at room temperature. Upon evaporation of the alcohol and recrystallization of the residue from the same alcohol, the dihydrochloride salt was obtained as a crystalline solid melting at 181°–182.5° C. It contained 50.89% carbon, 7.70% hydrogen and 7.77% nitrogen compared to the calculated values of 51.00%, 7.41% and 7.93%, respectively.

In a manner similar to that already described, other salts can be conveniently prepared by the reaction of the base with such acids as those previously enumerated.

The compound employed in the method of this invention or its non-toxic, pharmaceutically acceptable, acid-addition salts can be combined with solid or liquid pharmaceutical carriers and formulated in the form of tablets, lyophilized powders or capsules or dissolved or suspended in suitable solvents such as sterile water or ethanol for use in oral or parenteral administration. Representative formulations embodying the composition of Example 1 follow.

Formulation for 2400 Tablets

| | |
|---|---|
| 1 - (orthomethoxyphenyl) - 4 - (3 - methylthiopropyl)-piperazine _____grams__ | 60.00 |
| Milk sugar _____do____ | 260.72 |
| Acacia _____do____ | 4.80 |
| Corn starch _____do____ | 38.40 |
| Talc _____do____ | 10.52 |
| Stearic acid _____do____ | 6.56 |
| Distilled water _____ml___ | 24.00 |

Mix the piperazine compound with the milk sugar and pass the mixture through a 30 mesh screen. Dissolve the acacia in water and add the resulting solution to the piperazine-milk sugar mixture. Granulate the wet mass through a 6 mesh screen, dry the granulation at 50° C. overnight and grind the dried granulation to 20 mesh. Add the corn starch, talc and magnesium stearate to the dried granulation, pass through a 40 mesh screen, mix thoroughly by tumbling and compress into tablets using a 5/16″ punch so that 10 tablets weigh 1.58 grams and each tablet contains 25 mg. of the piperazine compound.

Formulation for 1000 Capsules

| | Grams |
|---|---|
| 1 - (orthomethoxyphenyl) - 4 - (3 - methylthiopropyl)-piperazine dihydrochloride _____ | 25.0 |
| Lactose _____ | 273.5 |
| Magnesium stearate _____ | 1.5 |

Mix the dihydrochloride with the lactose and blend with the magnesium stearate. Fill hard gelatin capsules with 300 mg. each of the blended mixture to produce capsules containing 25 mg. of the piperazine compound.

Parenteral Formulation for 1000 Vials

| | |
|---|---|
| 1 - (orthomethoxyphenyl) - 4 - (3 - methylthiopropyl)-piperazine phosphate _____grams__ | 10.95 |
| Monopotassium phosphate _____do____ | 6.0 |
| Sterile water _____liters__ | 1.0 |

Dissolve all the ingredients in 800 ml. of water and filter the resulting solution. Add enough water to the filtrate to make one liter of solution. Aseptically fill one ml. portions of the solution into 2 ml. vials and lyophilize so that each vial will contain 10 mg. of the piperazine phosphate salt. Stopper the vials with rubber plugs and seal.

Example 2

Four human patients were each orally administered a tablet prepared as previously described containing 25 mg. of 1-(orthomethoxyphenyl)-4-(3-methylthiopropyl)-piperazine and the effect of said compound on the blood pressure of each patient in a sitting position was recorded at intervals for a period of time with the following results:

| Time in Hours | Blood Pressure in mm. of Hg | | | |
|---|---|---|---|---|
| | Patient #1 | Patient #2 | Patient #3 | Patient #4 |
| 0 | 184/110 | 150/106 | 194/124 | 160/108 |
| 0.5 | 176/100 | 140/96 | 180/116 | 130/84 |
| 1 | 170/110 | 130/90 | 176/120 | 146/100 |
| 1.5 | 160/106 | 100/76 | 164/110 | 120/80 |
| 2 | 150/96 | 106/80 | 150/100 | 114/70 |
| 3 | 162/104 | 110/80 | 134/96 | 112/74 |
| 4 | 156/100 | 108/82 | 154/102 | 110/76 |
| 5 | 158/102 | 110/80 | 144/96 | 134/90 |
| 6 | 160/110 | 116/88 | 150/96 | 152/106 |
| 7 | 178/106 | 126/90 | 170/110 | 154/100 |

The foregoing data clearly illustrates the prolonged effect of 1-(orthomethoxyphenyl) - 4 - (3 - methylthiopropyl)piperazine in lowering blood pressure for at least seven hours at the dosage employed. In other tests, the oxygen analog at the same dosage failed to lower and maintain the blood pressure in humans for more than three hours. Similar results are obtained when acid-addition salts of either piperazine compound are employed—i.e., the 1-(orthomethoxyphenyl)-4 - (3 - methylthiopropyl)-piperazine is at least twice as effective in lowering blood pressure as its corresponding oxygen analog.

This application is a continuation-in-part of my copending application U.S. Serial No. 26,694, filed Nov. 4, 1960, now abandoned.

What is claimed is:

1. A method of lowering blood pressure in a warm blooded animal which comprises administering a composition containing a compound selected from the class consisting of 1-(orthomethoxyphenyl)-4 - (3 - methylthiopropyl)-piperazine and non-toxic, acid-addition salts thereof.

2. A method as claimed in claim 1 in which a composition containing 1-(orthomethoxyphenyl)-4-(3-methylthiopropyl)-piperazine is administered intravenously.

3. A method as claimed in claim 2 in which the composition is administered orally in tablet form.

4. A method as claimed in claim 1 in which a composition containing a non-toxic, acid-addition salt of 1-(orthomethoxyphenyl)-4-(3-methylthiopropyl) - piperazine is administered intravenously.

5. A method as claimed in claim 4 in which the salt employed in the composition is the dihydrochloride of 1-(orthomethoxyphenyl)-4-(3 - methylthiopropyl) - piperazine.

6. A method as claimed in claim 5 in which the composition is administered orally in tablet form.

7. A pharmaceutical composition for lowering blood pressure, the active component of which consists essentially of 1-(orthomethoxyphenyl) - 4 - (3 - methylthiopropyl)-piperazine.

References Cited in the file of this patent

UNITED STATES PATENTS

| | | |
|---|---|---|
| 2,722,529 | Fleming | Nov. 1, 1955 |
| 2,833,770 | Parcell | May 6, 1958 |
| 2,836,594 | Parcell | May 27, 1958 |
| 2,836,595 | Parcell | May 27, 1958 |
| 2,891,063 | Sommers | June 16, 1959 |

OTHER REFERENCES

Conant, The Chemistry of Organic Compounds, p. 264, (revised edition) 1939.

Bach et al., J.A.C.S. vol. 79, pp. 2221–2225, May 5, 1957.

Rosenfeld et al., Antibiotic Medicine and Clinical Therapy, VII:3, pp. 171–178, March 1960.

UNITED STATES PATENT OFFICE
CERTIFICATE OF CORRECTION

Patent No. 3,089,819                          May 14, 1963

James Harold Short

It is hereby certified that error appears in the above numbered patent requiring correction and that the said Letters Patent should read as corrected below.

Column 3, line 13, for "Nov." read -- May --.

Signed and sealed this 19th day of November 1963.

(SEAL)
Attest:

ERNEST W. SWIDER

Attesting Officer

EDWIN L. REYNOLDS

Acting Commissioner of Patents